United States Patent
Jaffe (10) Patent No.: US 8,126,797 B2
(45) Date of Patent: Feb. 28, 2012

(54) SYSTEM AND METHOD FOR DISPLAYING SIMPLE BINARY ELEMENTS FOR MULTIPLE TECHNICAL ANALYSIS INDICATORS REPRESENTING THE STATUS OF AN EQUITY ISSUE FOR SIMPLIFIED DECISION MAKING

(75) Inventor: Jonathan Jaffe, Gallatin, TN (US)

(73) Assignee: Positive Territory, Inc., Geneva, IL (US)

( * ) Notice: Subject to any disclaimer, the term of this patent is extended or adjusted under 35 U.S.C. 154(b) by 0 days.

(21) Appl. No.: 11/763,295

(22) Filed: Jun. 14, 2007

(65) Prior Publication Data

US 2008/0109383 A1     May 8, 2008

Related U.S. Application Data

(60) Provisional application No. 60/814,249, filed on Jun. 16, 2006.

(51) Int. Cl.
    *G06Q 40/00* (2012.01)
(52) U.S. Cl. .................................. 705/36 R; 705/37
(58) Field of Classification Search .............. 705/35, 705/36, 37, 36 R
See application file for complete search history.

(56) References Cited

U.S. PATENT DOCUMENTS

| 7,356,501 B2 * | 4/2008 | Churquina | 705/37 |
| 2002/0004774 A1 * | 1/2002 | Defarlo | 705/36 |
| 2006/0206405 A1 * | 9/2006 | Gambill | 705/37 |

OTHER PUBLICATIONS

StockTA.com Screen. <http://www.stockta.com/cgi-bin/screen.pl?action=Form&cobrand=> Oct. 9, 2004 Archive accessed via Internet Archive Wayback Machine <http://www.archive.org>.*
"StockTA.com FAQ" <http://www.stockta.com/cgi-bin/faq.pl> Jun. 3, 2004 Archive accessed via Internet Archive Wayback Machine <http://www.archive.org>.*

* cited by examiner

*Primary Examiner* — Eric T Wong
(74) *Attorney, Agent, or Firm* — Cook Alex Ltd.

(57) ABSTRACT

The present invention provides a system and method for performing complex analysis of multiple technical analysis indicators, generating multiple binary elements, then presenting the results of the analysis to a user in an easily understandable way. In the present invention, technical analysis indicators (TAI) are used to determine whether a positive development (PD) has occurred. When a technical analysis indicator (TAI) for a particular issue suggests that the price of said issue is likely to move upwards in the near future, the TAI is a positive development. When the TAI no longer suggests that the price of said issue is likely to trend upwards in the near future, the TAI is no longer a positive development (NLPD).

17 Claims, 8 Drawing Sheets

```
Abbreviated Summary for 04/25/2006, issued Tue Apr 25 17:02:00 2006

Symbol     Close SC;N AC;N      SMA20vol    ATR    RATR      CCI
LCC        42.73 3;1  6;1      1,486,700   2.15   5.04%   198.35
MCRL       15.78 3;1  7;1      1,278,560   0.65   4.11%   132.67
SGTL        8.84 3;1  4;2      1,785,900   0.35   3.94%    32.22
ADPT        5.60 3;1  6;1      1,173,990   0.22   3.93%     2.80
RHAT       30.37 3;1  7;2      4,525,800   1.19   3.92%   105.54
ATVI       13.60 3;1  5;2      3,852,840   0.44   3.21%    50.32
LWSN        7.54 3;1  6;2      1,108,560   0.22   2.92%    30.41
CCI        32.00 3;1  7;2      1,395,060   0.83   2.59%   185.13
STZ        24.64 3;1  4;1      1,683,400   0.62   2.50%    28.80
KSS        55.18 3;1  7;2      3,012,140   1.25   2.26%   151.29
EMC        13.51 3;1  5;2     17,421,200   0.30   2.22%   -26.74
UNM        19.82 3;1  5;2      2,368,040   0.42   2.12%    67.19
HUN        19.17 3;1  5;1      1,003,440   0.40   2.08%    60.92
TYC        26.41 3;1  5;1      7,777,010   0.51   1.94%    47.51
CBS        25.37 3;1  5;2      4,117,380   0.45   1.77%   111.12
FISV       41.94 3;1  5;1      1,629,180   0.74   1.76%     6.79
NWL        25.52 3;1  7;1      1,442,470   0.44   1.74%    93.46
IPG         9.52 3;1  5;2      2,812,080   0.14   1.42%    75.77
PG         57.27 3;1  6;1     10,940,500   0.78   1.37%    86.63
DTV        17.15 3;1  7;1      2,460,540   0.22   1.28%   132.46
XLP        23.50 3;1  5;1      1,086,700   0.21   0.87%    61.02

Symbols in this report:
LCC, MCRL, SGTL, ADPT, RHAT,
ATVI, LWSN, CCI, STZ, KSS,
EMC, UNM, HUN, TYC, CBS,
FISV, NWL, IPG, PG, DTV,
XLP Other results 21 issues had a TCPD count of 3 or more and were selected
1401 issues had a TCPD count of 3 or more and were not selected
846 issues had a TCPD count of 2
857 issues had a TCPD count of 1
931 issues had a TCPD count of 0
4056 active issues being tracked
8425 inactive issues not included
12481 total issues being tracked
```

Figure 7

| Issue | Target Closing | P_delta | P_reqd | ATR | ATRCM | A-ATRCM | RATR | TRIX | MACD | DPO |
|---|---|---|---|---|---|---|---|---|---|---|
| SVU | 29.47 | 29.50 | -0.03 | -0.10% | 0.55 | -18.17 | 18.17 | 1.85% | TRIX=NPD | MACD=CPD | DPO=needed |
| ARO | 25.10 | 25.20 | -0.10 | -0.40% | 1.20 | -12.03 | 12.03 | 4.77% | TRIX=CPD | MACD=CPD | DPO=needed |
| STXN | 4.05 | 4.02 | 0.03 | 0.70% | 0.31 | 10.50 | 10.50 | 7.83% | TRIX=CPD | MACD=CPD | DPO=needed |
| PG | 54.42 | 54.31 | 0.11 | 0.20% | 0.91 | 8.31 | 8.31 | 1.68% | TRIX=CPD | MACD=CPD | DPO=needed |
| ENTG | 9.79 | 9.73 | 0.06 | 0.60% | 0.42 | 7.03 | 7.03 | 4.34% | TRIX=CPD | MACD=CPD | DPO=needed |
| KOMG | 9.41 | 9.73 | -0.32 | -0.70% | 1.90 | -5.95 | 5.95 | 4.46% | TRIX=CPD | MACD=CPD | DPO=needed |
| ADBE | 29.05 | 28.84 | 0.21 | 0.70% | 0.98 | 4.68 | 4.68 | 3.41% | TRIX=CPD | MACD=CPD | DPO=needed |
| LNC | 56.41 | 56.20 | 0.21 | 0.40% | 0.97 | 4.60 | 4.60 | 1.72% | TRIX=CPD | MACD=CPD | DPO=needed |
| SBUX | 35.61 | 35.42 | 0.19 | 0.50% | 0.82 | 4.33 | 4.33 | 2.32% | TRIX=CPD | MACD=CPD | DPO=needed |
| EXC | 58.28 | 58.56 | -0.28 | -0.50% | 1.12 | -3.99 | 3.99 | 1.91% | TRIX=needed | MACD=CPD | DPO=CPD |
| ERTS | 42.79 | 42.42 | 0.37 | 0.90% | 1.34 | 3.63 | 3.63 | 3.17% | TRIX=CPD | MACD=CPD | DPO=needed |
| TKC | 12.46 | 12.22 | 0.24 | 2.00% | 0.81 | 3.37 | 3.37 | 6.62% | TRIX=CPD | MACD=CPD | DPO=needed |
| NI | 21.88 | 21.77 | 0.11 | 0.50% | 0.36 | 3.31 | 3.31 | 1.67% | TRIX=CPD | MACD=CPD | DPO=CPD |
| MXIM | 31.37 | 31.06 | 0.31 | 1.00% | 0.94 | 3.03 | 3.03 | 3.03% | TRIX=CPD | MACD=CPD | DPO=needed |
| NFB | 29.72 | 29.60 | 0.12 | 0.40% | 0.35 | 2.95 | 2.95 | 1.20% | TRIX=CPD | MACD=CPD | DPO=CPD |
| ED | 45.05 | 44.83 | 0.22 | 0.50% | 0.63 | 2.88 | 2.88 | 1.41% | TRIX=needed | MACD=needed | DPO=CPD |
| BAX | 38.18 | 37.91 | 0.27 | 0.70% | 0.70 | 2.59 | 2.59 | 1.84% | TRIX=needed | MACD=CPD | DPO=needed |
| LLY | 51.93 | 51.61 | 0.32 | 0.60% | 0.82 | 2.58 | 2.58 | 1.60% | TRIX=needed | MACD=CPD | DPO=needed |
| NCC | 37.58 | 37.31 | 0.27 | 0.70% | 0.62 | 2.29 | 2.29 | 1.65% | TRIX=CPD | MACD=CPD | DPO=needed |
| BMET | 35.09 | 34.74 | 0.35 | 1.00% | 0.75 | 2.15 | 2.15 | 2.17% | TRIX=CPD | MACD=CPD | DPO=CPD |
| NBIX | 19.61 | 18.98 | 0.63 | 3.30% | 1.33 | 2.11 | 2.11 | 7.02% | TRIX=CPD | MACD=CPD | DPO=needed |
| AEP | 35.29 | 35.05 | 0.24 | 0.70% | 0.49 | 2.05 | 2.05 | 1.40% | TRIX=needed | MACD=CPD | DPO=needed |
| THLD | 4.14 | 3.91 | 0.23 | 5.90% | 0.45 | 1.98 | 1.98 | 11.62% | TRIX=CPD | MACD=needed | DPO=CPD |
| DOVP | 2.92 | 2.77 | 0.15 | 5.40% | 0.27 | 1.83 | 1.83 | 9.91% | TRIX=CPD | MACD=CPD | DPO=CPD |
| SIRF | 29.50 | 28.59 | 0.91 | 3.20% | 1.65 | 1.81 | 1.81 | 5.77% | TRIX=CPD | MACD=CPD | DPO=needed |
| GNTX | 14.57 | 14.36 | 0.21 | 1.50% | 0.35 | 1.68 | 1.68 | 2.45% | TRIX=NPD | MACD=CPD | DPO=needed |
| MCD | 33.29 | 32.93 | 0.36 | 1.10% | 0.61 | 1.68 | 1.68 | 1.84% | TRIX=CPD | MACD=CPD | DPO=needed |
| ETR | 73.16 | 72.51 | 0.65 | 0.90% | 1.07 | 1.64 | 1.64 | 1.47% | TRIX=needed | MACD=CPD | DPO=CPD |
| MHP | 51.75 | 51.15 | 0.60 | 1.20% | 0.97 | 1.61 | 1.61 | 1.89% | TRIX=CPD | MACD=CPD | DPO=needed |
| TGT | 48.96 | 48.21 | 0.75 | 1.60% | 1.11 | 1.48 | 1.48 | 2.30% | TRIX=CPD | MACD=CPD | DPO=needed |
| WON | 8.21 | 8.05 | 0.16 | 2.00% | 0.22 | 1.39 | 1.39 | 2.76% | TRIX=CPD | MACD=CPD | DPO=needed |
| KMB | 60.62 | 59.98 | 0.64 | 1.10% | 0.88 | 1.38 | 1.38 | 1.47% | TRIX=needed | MACD=needed | DPO=CPD |
| GNW | 33.71 | 33.27 | 0.44 | 1.30% | 0.57 | 1.30 | 1.30 | 1.71% | TRIX=needed | MACD=CPD | DPO=CPD |
| SCSS | 22.79 | 21.86 | 0.93 | 4.30% | 1.18 | 1.27 | 1.27 | 5.40% | TRIX=CPD | MACD=CPD | DPO=needed |
| CMS | 13.11 | 12.92 | 0.19 | 1.50% | 0.23 | 1.24 | 1.24 | 1.82% | TRIX=needed | MACD=CPD | DPO=CPD |
| CRDN | 44.66 | 43.19 | 1.47 | 3.40% | 1.80 | 1.22 | 1.22 | 4.17% | TRIX=CPD | MACD=CPD | DPO=CPD |
| LLTC | 35.06 | 34.41 | 0.65 | 1.90% | 0.77 | 1.19 | 1.19 | 2.25% | TRIX=CPD | MACD=CPD | DPO=CPD |
| ABT | 43.32 | 42.72 | 0.60 | 1.40% | 0.71 | 1.18 | 1.18 | 1.66% | TRIX=needed | MACD=CPD | DPO=CPD |
| KLAC | 40.63 | 39.35 | 1.28 | 3.30% | 1.42 | 1.11 | 1.11 | 1.71% | TRIX=CPD | MACD=CPD | DPO=needed |
| PALM | 17.53 | 16.58 | 0.95 | 5.70% | 1.05 | 1.11 | 1.11 | 6.34% | TRIX=CPD | MACD=CPD | DPO=needed |
| CELG | 43.94 | 42.19 | 1.75 | 4.10% | 1.89 | 1.08 | 1.08 | 4.49% | TRIX=needed | MACD=CPD | DPO=CPD |
| RIMM | 65.35 | 63.17 | 2.18 | 3.50% | 2.36 | 1.08 | 1.08 | 3.73% | TRIX=CPD | MACD=CPD | DPO=needed |

Figure 8

| Issue | target_price | last_price | percent_achieved | atr | atrcm | a-atrcm | ratr | HLI | trix | macd | dpo |
|---|---|---|---|---|---|---|---|---|---|---|---|
| BMET | 35.09 | 35.29 | 100.57% | 0.75 | 2.15 | 2.15 | 2.17% | 60,177,313 | TRIX=CPD | MACD=CPD | DPO=needed |
| PG | 54.42 | 54.68 | 100.48% | 0.91 | 8.31 | 8.31 | 1.68% | 510,568,525 | TRIX=CPD | MACD=CPD | DPO=needed |
| KMB | 60.62 | 60.87 | 100.41% | 0.88 | 1.38 | 1.38 | 1.47% | 104,418,581 | TRIX=CPD | MACD=needed | DPO=CPD |
| ADBE | 29.05 | 29.14 | 100.31% | 0.98 | 4.68 | 4.68 | 3.41% | 235,190,100 | TRIX=CPD | MACD=CPD | DPO=needed |
| EXC | 58.28 | 58.43 | 100.26% | 1.12 | -3.99 | 3.99 | 1.91% | 230,961,817 | TRIX=needed | MACD=CPD | DPO=CPD |
| ERTS | 42.79 | 42.78 | 99.98% | 1.34 | 3.63 | 3.63 | 3.17% | 213,460,570 | TRIX=CPD | MACD=CPD | DPO=needed |
| SVU | 29.47 | 29.46 | 99.97% | 0.55 | -18.17 | 18.17 | 1.85% | 70,849,560 | TRIX=NPD | MACD=CPD | DPO=needed |
| LLY | 51.93 | 51.74 | 99.63% | 0.82 | 2.58 | 2.58 | 1.60% | 186,275,201 | TRIX=needed | MACD=CPD | DPO=CPD |
| SBUX | 35.61 | 35.40 | 99.41% | 0.82 | 4.33 | 4.33 | 2.32% | 233,960,777 | TRIX=CPD | MACD=CPD | DPO=needed |
| NI | 21.88 | 21.70 | 99.18% | 0.36 | 3.31 | 3.31 | 1.57% | 25,655,728 | TRIX=needed | MACD=CPD | DPO=CPD |
| MXIM | 31.37 | 31.10 | 99.14% | 0.94 | 3.03 | 3.03 | 3.03% | 216,861,646 | TRIX=CPD | MACD=CPD | DPO=needed |
| NFB | 29.72 | 29.43 | 99.02% | 0.35 | 2.95 | 2.95 | 1.20% | 63,852,085 | TRIX=CPD | MACD=needed | DPO=CPD |
| LM | 96.38 | 95.27 | 98.85% | 3.48 | | | 3.61% | 193,515,132 | TRIX=CPD | MACD=CPD | DPO=needed |
| MHP | 51.75 | 51.12 | 98.78% | 0.97 | 1.61 | 1.61 | 1.99% | 95,912,647 | TRIX=CPD | MACD=CPD | DPO=needed |
| ED | 45.05 | 44.49 | 98.76% | 0.63 | 2.88 | 2.88 | 1.41% | 76,657,286 | TRIX=needed | MACD=CPD | DPO=CPD |
| BLS | 35.62 | 35.14 | 98.65% | 0.69 | 0.68 | 0.68 | 1.99% | 229,786,548 | TRIX=needed | MACD=CPD | DPO=needed |
| TGT | 48.96 | 48.28 | 98.61% | 1.11 | 1.48 | 1.48 | 2.30% | 328,498,354 | TRIX=needed | MACD=CPD | DPO=CPD |
| KLAC | 40.63 | 40.06 | 98.60% | 1.42 | 1.11 | 1.11 | 3.61% | 235,589,976 | TRIX=CPD | MACD=CPD | DPO=needed |
| ABT | 43.32 | 42.70 | 98.57% | 0.71 | 1.18 | 1.18 | 1.66% | 197,987,341 | TRIX=needed | MACD=CPD | DPO=CPD |
| ETR | 73.16 | 72.06 | 98.50% | 1.07 | 1.64 | 1.64 | 1.47% | 79,315,791 | TRIX=CPD | MACD=CPD | DPO=CPD |
| BAX | 38.18 | 37.56 | 98.38% | 0.70 | 2.59 | 2.59 | 1.84% | 101,149,945 | TRIX=needed | MACD=CPD | DPO=CPD |
| ENTG | 9.79 | 9.60 | 98.06% | 0.42 | 7.03 | 7.03 | 4.34% | 10,135,900 | TRIX=CPD | MACD=CPD | DPO=needed |
| AEP | 35.29 | 34.58 | 97.99% | 0.49 | 2.05 | 2.05 | 1.40% | 78,815,181 | TRIX=needed | MACD=CPD | DPO=CPD |
| NCC | 37.58 | 36.82 | 97.98% | 0.62 | 2.29 | 2.29 | 1.65% | 82,512,747 | TRIX=CPD | MACD=needed | DPO=CPD |
| VZ | 32.18 | 31.52 | 97.95% | 0.53 | 0.62 | 0.62 | 1.68% | 310,612,199 | TRIX=needed | MACD=CPD | DPO=CPD |
| CMS | 13.11 | 12.84 | 97.94% | 0.23 | 1.24 | 1.24 | 1.82% | 27,492,533 | TRIX=CPD | MACD=CPD | DPO=CPD |
| D | 74.40 | 72.86 | 97.93% | 1.10 | 0.79 | 0.79 | 1.51% | 117,283,625 | TRIX=needed | MACD=CPD | DPO=CPD |
| GENZ | 62.56 | 61.26 | 97.92% | 1.76 | 0.79 | 0.79 | 2.91% | 205,477,486 | TRIX=needed | MACD=CPD | DPO=CPD |
| LNC | 56.41 | 55.20 | 97.85% | 0.97 | 4.60 | 4.60 | 1.72% | 99,970,528 | TRIX=CPD | MACD=CPD | DPO=needed |
| LLTC | 35.06 | 34.24 | 97.66% | 0.77 | 1.19 | 1.19 | 2.25% | 179,215,314 | TRIX=NPD | MACD=CPD | DPO=CPD |
| GNTX | 14.57 | 14.22 | 97.60% | 0.35 | 1.68 | 1.68 | 2.45% | 18,094,887 | TRIX=CPD | MACD=CPD | DPO=needed |
| BBBY | 35.53 | 34.65 | 97.52% | 0.79 | 1.01 | 1.01 | 2.26% | 116,470,976 | TRIX=needed | MACD=CPD | DPO=needed |
| KOMG | 42.36 | 41.31 | 97.52% | 1.90 | -5.95 | 5.95 | 4.46% | 57,804,965 | TRIX=CPD | MACD=CPD | DPO=needed |
| GNW | 33.71 | 32.84 | 97.42% | 0.57 | 1.30 | 1.30 | 1.71% | 85,929,424 | TRIX=needed | MACD=CPD | DPO=CPD |
| ARO | 25.10 | 24.42 | 97.29% | 1.20 | -12.03 | 12.03 | 4.77% | 36,942,949 | TRIX=CPD | MACD=needed | DPO=needed |
| AAI | 12.33 | 11.97 | 97.08% | 0.62 | 0.89 | 0.89 | 5.29% | 22,437,847 | TRIX=CPD | MACD=CPD | DPO=needed |
| GYI | 67.81 | 65.76 | 96.98% | 1.31 | 0.57 | 0.57 | 1.99% | 66,687,563 | TRIX=needed | MACD=CPD | DPO=needed |
| SVM | 10.82 | 10.48 | 96.86% | 0.26 | 0.73 | 0.73 | 2.50% | 11,799,037 | TRIX=CPD | MACD=CPD | DPO=needed |
| MCD | 33.23 | 32.23 | 96.82% | 0.61 | 1.68 | 1.68 | 1.84% | 190,542,531 | TRIX=CPD | MACD=CPD | DPO=CPD |
| IYR | 71.57 | 69.26 | 96.77% | 1.19 | 0.72 | 0.72 | 1.70% | 212,108,349 | TRIX=needed | MACD=CPD | DPO=needed |
| HAS | 18.76 | 18.15 | 96.75% | 0.29 | 0.63 | 0.63 | 1.57% | 28,418,343 | TRIX=CPD | MACD=CPD | DPO=CPD |
| DGX | 59.12 | 57.16 | 96.68% | 0.96 | 0.40 | 0.40 | 1.70% | 68,639,514 | TRIX=CPD | MACD=needed | DPO=CPD |
| WIND | 9.29 | 8.98 | 96.66% | 0.38 | 1.05 | 1.05 | 4.23% | 14,797,963 | TRIX=CPD | MACD=CPD | DPO=CPD |
| DDS | 29.82 | 28.80 | 96.58% | 0.69 | 0.59 | 0.59 | 2.39% | 42,879,372 | TRIX=needed | MACD=CPD | DPO=needed |
| WON | 8.21 | 7.92 | 96.47% | 0.22 | 1.39 | 1.39 | 2.76% | 10,499,655 | TRIX=CPD | MACD=CPD | DPO=CPD |
| TKC | 12.46 | 12.00 | 96.31% | 0.81 | 3.37 | 3.37 | 6.62% | 15,147,546 | TRIX=CPD | MACD=CPD | DPO=needed |
| WB | 55.35 | 53.28 | 96.26% | 0.88 | 0.61 | 0.61 | 1.64% | 380,603,003 | TRIX=needed | MACD=CPD | DPO=CPD |

SYSTEM AND METHOD FOR DISPLAYING SIMPLE BINARY ELEMENTS FOR MULTIPLE TECHNICAL ANALYSIS INDICATORS REPRESENTING THE STATUS OF AN EQUITY ISSUE FOR SIMPLIFIED DECISION MAKING

CROSS REFERENCE TO RELATED APPLICATIONS

This application claims priority to U.S. Provisional Application Ser. No. 60/814,249 entitled "A SYSTEM AND METHOD FOR DISPLAYING SIMPLE BINARY ELEMENTS FOR MULTIPLE TECHNICAL ANALYSIS INDICATORS REPRESENTING THE STATUS OF AN EQUITY ISSUE FOR SIMPLIPIED DECISION MAKING," filed on Jun. 16, 2006, the content of which is hereby fully incorporated by reference.

BACKGROUND OF THE INVENTION

The analysis of equity issues such as common stock (hereinafter, "issues") (also variably known as stocks or equities) can be generally split into two different methods or points of view. The first is fundamental analysis. Fundamental issue analysis requires a close examination of a company's financial statements to determine its current financial strength and prospects for future growth and profitability in order to estimate whether the issue's price is undervalued or overvalued.

The other method is technical analysis. Technical analysis does not concern itself with a company's finances or business. Rather, technical analysis involves the study of an issue's trading patterns. For example, charts, trend lines, or support and resistance levels may be used in order to predict future movements in an issue's price, and to therefore assist in identifying potential trading opportunities. The present invention is specifically related to the use of what are called technical analysis indicators (TAI). TAIs are mathematical constructs used to describe historical movement and trends of issue prices. There are a wide range of different TAIs used by technical analysts. One of these is the Chande Momentum Oscillator (CMO). The higher the CMO for an issue, the more likely it is that the issue will trend upward soon. Also, the CMO approaching the exponential moving average of the CMO indicates there is a potential purchasing opportunity. Therefore, in order to effectively use CMO to monitor issues, one must first become educated on the various threshold and comparison values required in order to effectively use CMO. Also, before calculating CMO, one must first select a period n to be used in the calculations. For instance, one might select a period n of 21 days. Further complicating the use of TA's, it is common to use multiple TA's, each TAI providing more information regarding the issue. Use of these other TA's require similar inquiries as those made with respect to CMO, but specific to those other TA's. That is, there may be different time periods, different threshold values, or the TAI may be compared with a value other than its exponential moving average. As a result, if an investor wishes to use a number of different TA's in evaluating purchasing opportunities, the investor must invest considerably in educating him or herself before becoming able to surpass random chance in selection. The present invention presents a system and method for displaying simple binary elements for multiple technical analysis indicators representing the status of an issue for simplified decision making.

SUMMARY OF THE INVENTION

The present invention provides a system and method for performing complex analysis of multiple technical analysis indicators, generating multiple binary elements, then presenting the results of the analysis to a user in an easily understandable way. In the present invention, technical analysis indicators (TAI) are used to determine whether a positive development (PD) has occurred. Briefly, when a technical analysis indicator (TAI) for a particular issue suggests that the price of said issue is likely to move upwards in the near future, the TAI is a positive development. When the TAI no longer suggests that the price of said issue is likely to trend upwards in the near future, the TAI is no longer a positive development (NLPD). Prior art methods of using technical analysis indicators did not utilize a simple binary analysis. As a result, it was difficult and time consuming to sift through multiple TAIs for large numbers of issues. The present invention provides a user with simple binary indicators for multiple TAIs.

BRIEF DESCRIPTION OF THE DRAWINGS

In describing the preferred embodiment, reference is made to the accompanying drawing figures, and wherein:

FIG. 6 is a sample report according to an embodiment of the present invention;

FIG. 7 is an alternate sample report according to an embodiment of the present invention; and FIG. 8 is another alternate sample report an embodiment of the present invention.

DETAILED DESCRIPTION OF THE PREFERRED EMBODIMENT

Figure 4:
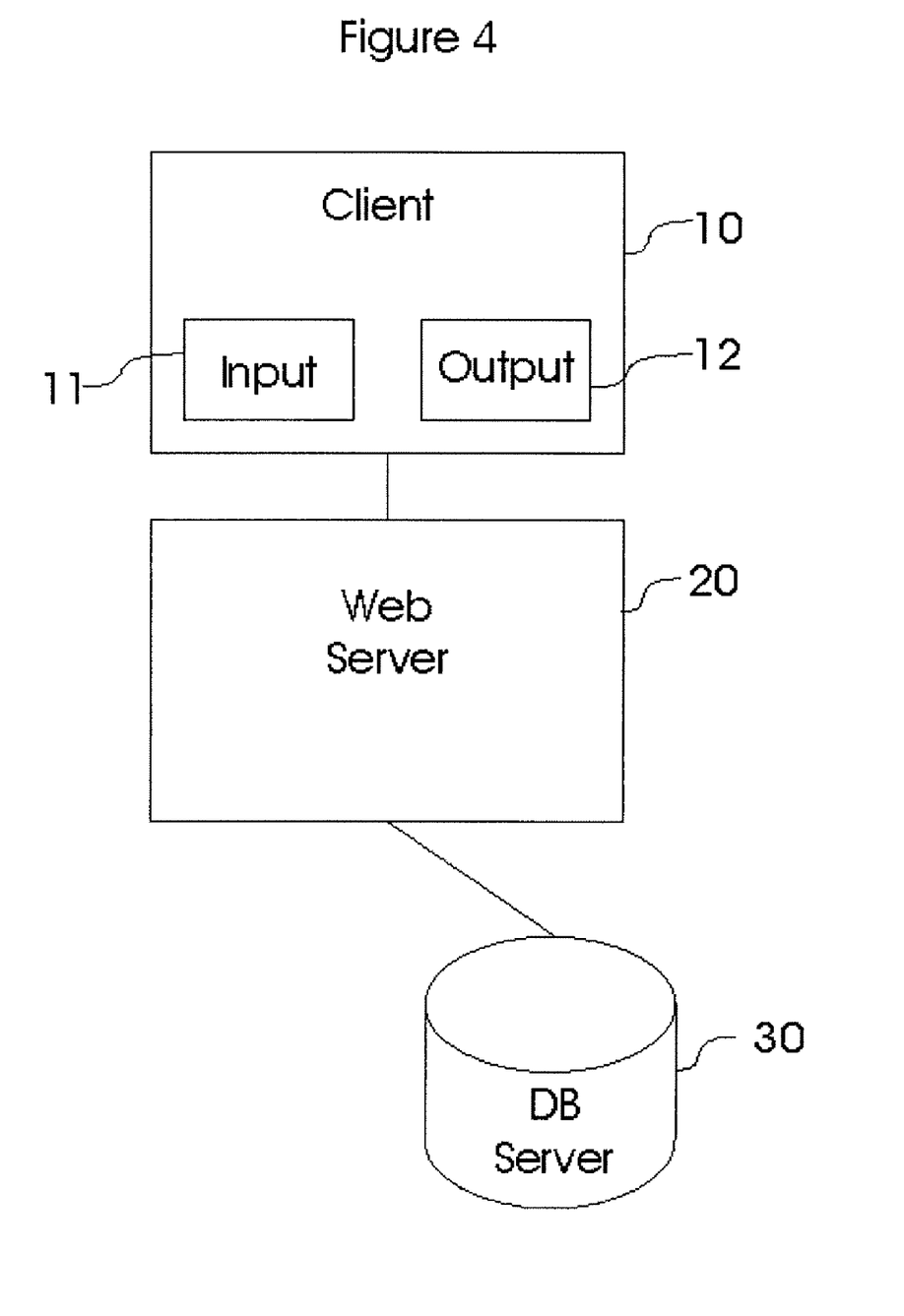
FIG. 4 is a block diagram depicting the structure of an embodiment of the present invention.

Referring to FIG. 4, the preferred embodiment of the present invention includes client 10, web server 20, and database server 30. Client 10 is a personal computer having an input device 11 (preferably, a mouse and keyboard) as well as an output device 12 (preferably, a CRT or LCD display). Client 10 must be able to display the reports generated by web server 20 to the user of client 10. In the preferred embodiment, the reports are sent via e-mail. Accordingly, client 10 must be able to display these e-mailed reports. Therefore, an e-mail application such as Outlook by Microsoft or Thunderbird by Mozilla is preferably installed on client 10. Or, client 10 may display the e-mailed reports using a web browser (e.g., Internet Explorer by Microsoft or Firefox by Mozilla) in connection with web-based e-mail sites such as those of Google, Yahoo or Hotmail. Alternatively, the user may choose to access the reports via web access provided by web server 20 of the present invention. In this method of viewing the reports, client 10 connects to web server 20 and downloads the reports therefrom. Client 10 need not necessarily be a personal computer, as devices such as cellular phones, PDAs (i.e., personal digital assistants) and handheld e-mail devices such as the Blackberry have the functionality, input device and output device required by the present invention.

Client 10 is connected to web server 20 over the internet. Web server 20 is a computer connected to database server 30. Web server 20 serves web pages to client 10, allowing client 10 to perform functions such as updating subscription information, reviewing various educational materials stored on web server 20 and, if the user has chosen web access to receive reports, downloading reports.

The database server 30 is connected to the web server 20. The particular form of the connection is not significant but, in the preferred embodiment, the database server 30 is connected to the web server 20 over a local area network. The database server 30 stores information on the issues being monitored. Preferably, the database server 30 stores at least the opening price, closing price, high price, low price and volume for each issue, each day. At the end of each trading day, the database server 30 is automatically updated with the day's issue data using data available from commercial providers of daily issue data. The database server 30 additionally stores data relating to the TAIs, as well as any other data needed to perform or optimize the performance of the tasks performed by the database server 30.

Figure 5:
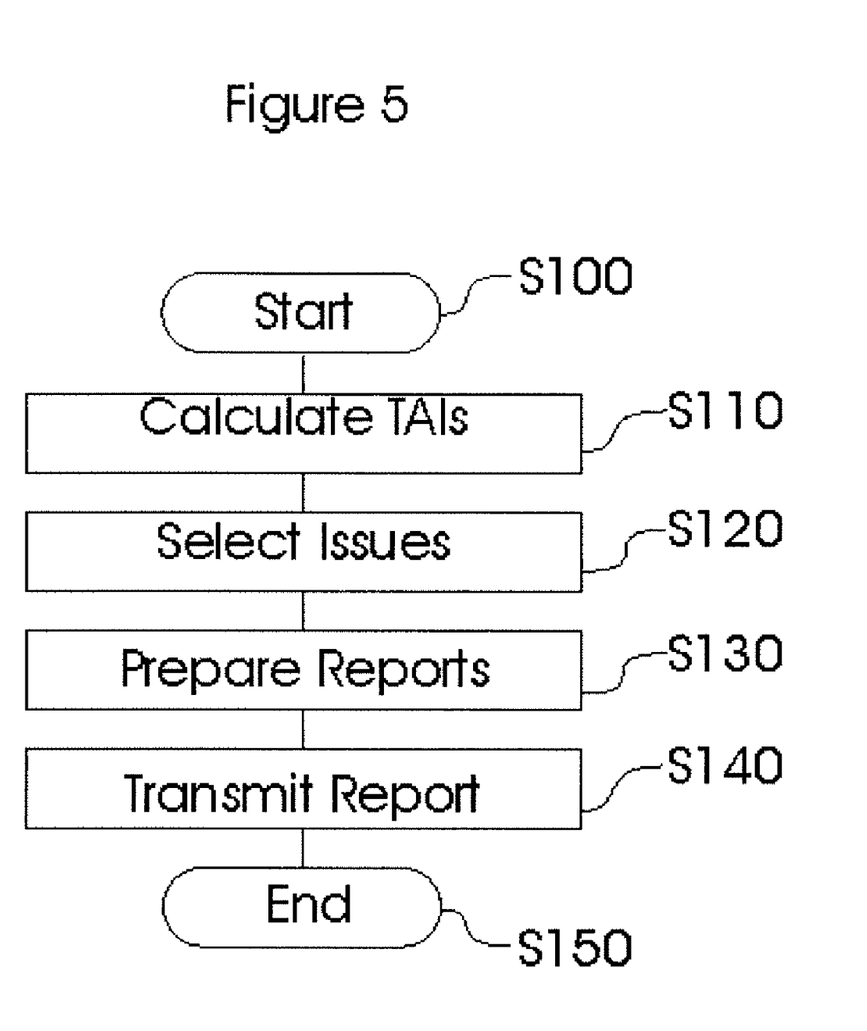
FIG. 5 is a flowchart depicting the steps performed by database server 30 in an embodiment of the present invention.

FIG. 5 is a flowchart demonstrating the tasks performed by database server 30 after the close of trading each day. The tasks shown in FIG. 5 are typically performed automatically at the end of each trading day. First, at step S110, database server 30 calculates the selected TAIs. Database server 30 also determines whether the selected TAIs are new positive developments, cumulative positive developments, or not a positive development. Various other calculations are also performed at this juncture, to be discussed below. Then, at step S120, the database server 30 selects those issues meeting predetermined selection criteria. These selection criteria will be discussed in more detail below in connection with FIGS. 6 and 7. At step S130, database server 30 prepares reports viewable by the client. Finally, at step S140, database server 30 transmits the prepared report to the client. This transmission is done both by e-mail and by placing a copy of the report on web server 20 for downloading by client 10. All these steps will be discussed in greater detail below.

Of primary importance to the present invention are the TAIs Detrended Price Oscillator, Moving Average Convergence/Divergence and Triple Exponential Smoothing Of The Log Of The Closing Price. Positive developments with respect to each of the above TAIs will now be illustrated in detail.

Figure 1:
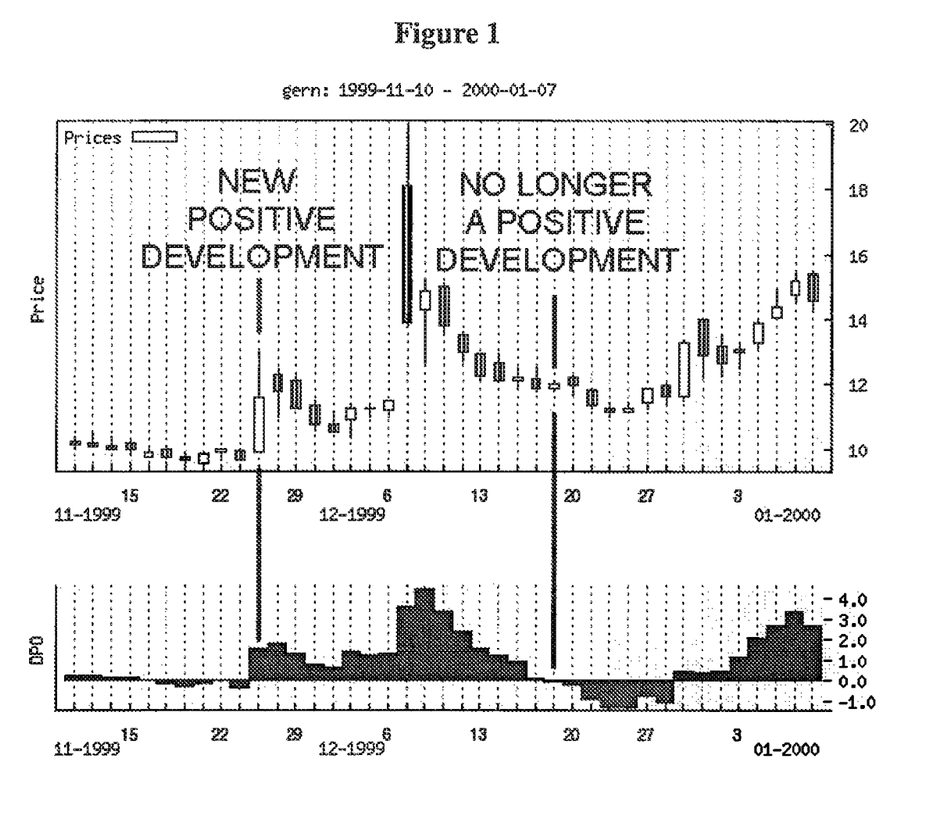
FIG. 1 is a chart depicting the use of the Detrended Price Oscillator.

As its name implies, the Detrended Price Oscillator (DPO) tries to eliminate the trend in prices. In removing the longer-term cycles from prices, the DPO makes the shorter-term cycles more visible. Detrended prices help to more easily identify both short-term cycles and oversold or overbought levels. To calculate the DPO, we must first decide on the time frame that one wishes to analyze. For the sake of example, a time frame of 20 days will be used. A variable n is then assigned a value equal to half of the cycle period (10 days). Next, a simple moving average (SMA) is calculated, based upon the following equation:

$$SMA(10)(price) = \left(\sum_{i=1}^{10} C_i\right) / 10 \quad \text{[Equation 1]}$$

where $C_i$ is the closing price on day i. A further variable p is assigned a value equal to one half n plus one, or six (6). Finally, the SMA from p days ago is subtracted from today's closing price, or:

$$DPO = C_{today} - (SMA(10)(price) \text{ from six days ago}) \quad \text{[Equation 2]}$$

This calculation effectively moves the DPO back 6 days to eliminate the trend in prices.

DPO becomes a new positive development, or NPD, when DPO crosses above zero. This TAI is no longer positive when DPO crosses below zero. If this TAI is still positive tomorrow, it will no longer be new (i.e., a NPD), but will be a cumulative positive development, or CPD. That is, the indicator remains positive, but it is no longer "new." FIG. 1 is a graphic depiction of the use of DPO. The top portion of FIG. 1, labeled "Price," is a chart of the trading ranges of Geron Corporation stock (ticker symbol: GERN) from Nov. 10, 1999 to Jan. 7, 2000. The bottom portion of FIG. 1, labeled "DPO," shows calculated DPO values for the same period. As can be clearly seen from the graph, DPO crossed above zero on Dec. 24, 1999. On that day, DPO was a new positive development (NPD). From Dec. 25, 1999 to Jan. 16, 2000, DPO remained positive. As a result, on each of the days in the range, DPO was a cumulative positive development (CPD). On Jan. 17, 2000, DPO crossed below zero, and was no longer a positive development.

Figure 2:
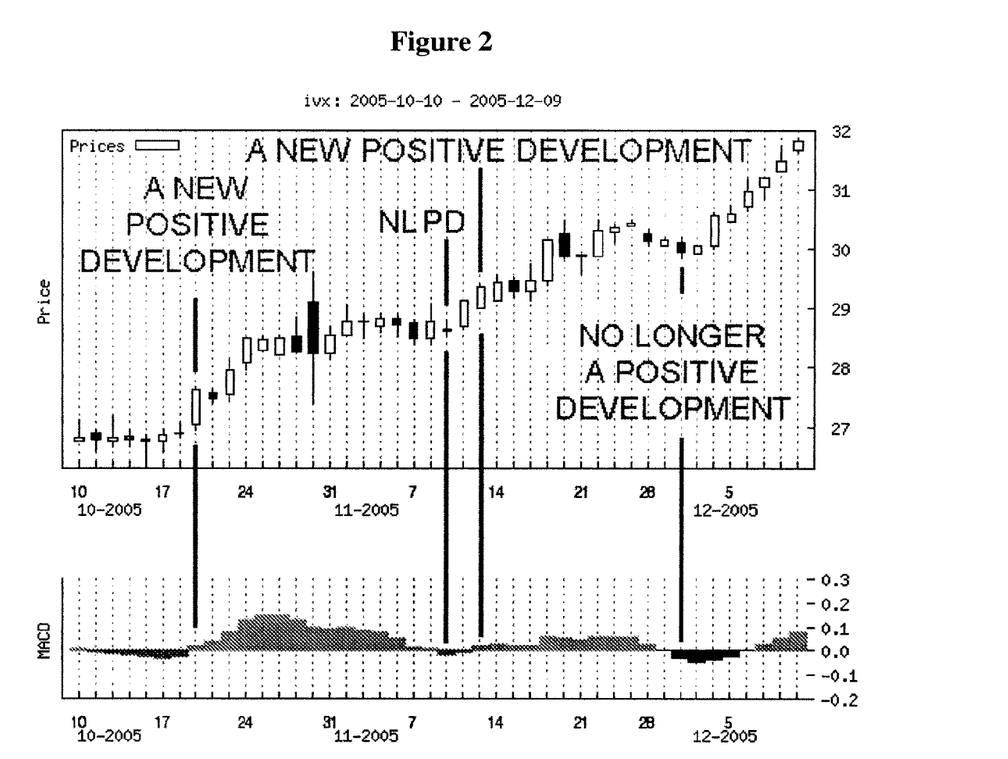
FIG. 2 is a chart depicting the use of the Moving Average Convergence/Divergence.

Another TAI used by the present invention is the Moving Average Convergence/Divergence (MACD). MACD is a price-based lagging indicator that relates two exponential moving averages (EMAs). MACD can be used in three ways. First, it can suggest buying or selling the issue when MACD crosses its signal line. Second, the issue's price diverging from the MACD can be taken as the end of the current trend. Third, the MACD rising dramatically can be an indication that the issue is overbought. MACD requires the calculation of three EMAs. EMA considers more recent data to be more relevant than older data and weights them accordingly. To calculate today's EMA, you need only these values: yesterday's EMA, today's value (for example, today's closing price), the number of periods to average (n), and a number k called the exponential percentage, but more commonly known as the smoothing constant.

$$k = 2/(n+1) \quad \text{[Equation 3]}$$

The EMA is sometimes described by the smoothing constant and sometimes by the equivalent number of periods to achieve that smoothing constant. For example, referring to the formula above, a 20% smoothing constant is the same as a 9 period smoothing constant. EMA is calculated according to the following equation:

$$EMA_{today} = Value_{today} \cdot k + EMA_{yesterday} \cdot (1-k) \quad \text{[Equation 4]}$$

Before proceeding further in describing MACD, exponential moving averages (EMA) will briefly be discussed. As an example, we will calculate the exponential moving average over two periods (n=2). With n=2, k is equal to 0.33. The EMA calculation is demonstrated in the following table (since no day is available prior to day 1, the EMA is set to the Value that day):

TABLE 1

| A<br>Day | B<br>Value | C<br>Value * k | D<br>Yesterday's<br>EMA * (1 − k) | E<br>Today's<br>EMA = (C + D) |
|---|---|---|---|---|
| 1 | 10 | | | 10 |
| 2 | 12 | 3.96 | 6.67 | 10.66 |
| 3 | 14 | 4.62 | 7.14 | 11.76 |
| 4 | 16 | 5.28 | 7.88 | 13.16 |
| 5 | 12 | 3.96 | 8.82 | 12.78 |

Notice that values for the previous periods are not summed. All that is needed is today's value, yesterday's EMA, and k (which is defined using n).

As noted above, MACD requires the calculation of three EMAs. The first two smooth the closing price:

$$EMA_{slow}=EMA(26)(\text{Closing price}) \quad [\text{Equation 5}]$$

$$EMA_{fast}=EMA(12)(\text{Closing price}) \quad [\text{Equation 6}]$$

Then:

$$MACD=EMA_{fast}-EMA_{slow} \quad [\text{Equation 7}]$$

In other words, MACD is the difference between the EMA for a brief period and the EMA for a longer period. One further EMA needs to be calculated utilizing a signal (or trigger) period of 9 days:

$$MACD_{signal}=EMA(9)(MACD) \quad [\text{Equation 8}]$$

Finally, a MACD histogram is determined:

$$MACD\text{ histogram}=MACD-MACD_{signal} \quad [\text{Equation 9}]$$

For MACD, an NPD occurs when MACD histogram crosses from negative to positive (i.e., when MACD becomes higher than $MACD_{signal}$). This TAI is no longer positive when the MACD histogram less than zero (i.e., MACD is less than $MACD_{signal}$). If the MACD histogram is still positive tomorrow, it will no longer be new, but will be a cumulative positive development. FIG. 2 is a graphic depiction of the use of MACD. The top portion of FIG. 2, labeled "Price," is a chart of the trading ranges of Ivax Corporation stock (ticker symbol: IVX) from Oct. 10, 2005 to Dec. 9, 2005. The bottom portion of FIG. 2, labeled "MACD," shows calculated MACD histogram values for the same period. As can be clearly seen from the graph, MACD became a new positive development twice between Oct. 19, 2005 and Dec. 2, 2005.

Figure 3:
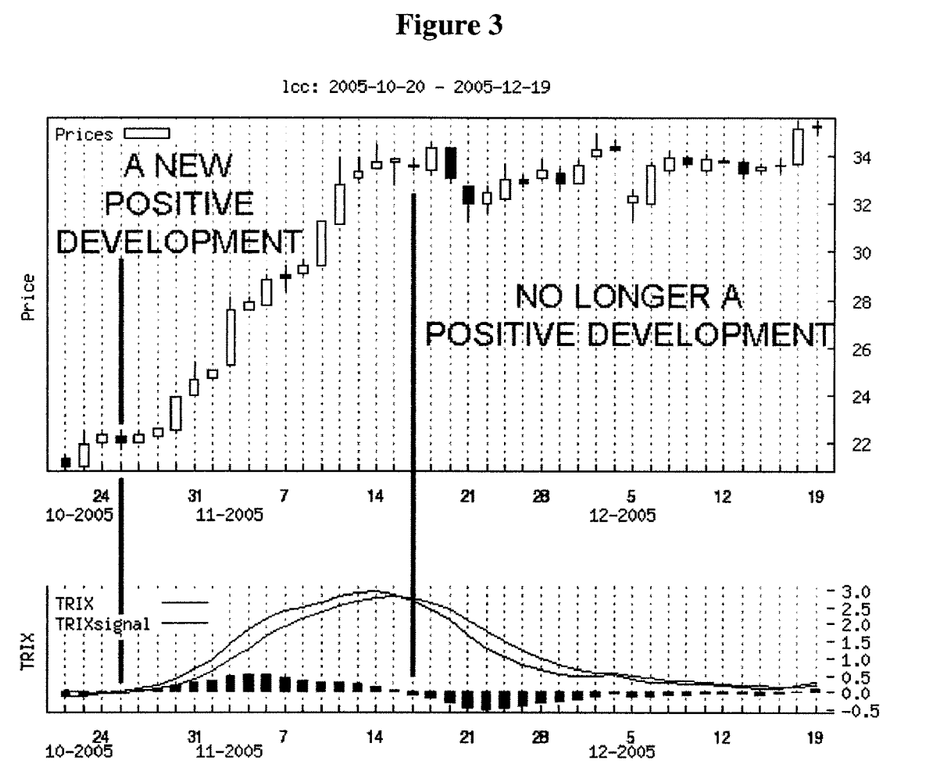
FIG. 3 is a chart depicting the use of the Triple Exponential Smoothing Of The Log Of The Closing Price.

A third TAI used by the present invention is the Triple Exponential Smoothing Of The Log Of The Closing Price, or TRIX. TRIX is based on a one-day difference of the triple-smoothed exponential moving average of the closing price. The indicator eliminates cycles shorter than the selected period. TRIX can function as a momentum indicator and identify oversold and overbought markets. TRIX is based on a one-day difference of the triple-smoothed EMA of closing price and eliminates cycles shorter than the selected period. In calculating TRIX, the number of periods (n) must be selected based on the trading time frame. For this example, n will equal six (6), meaning k=2/(6+1), or 0.2857 (see discussion of EMA) above. First, three EMAs are recursively calculated:

$$EMA_{today}=EMA(6)(\text{ClosingPrice}_{today}) \quad [\text{Equation 10}]$$

$$EMA2_{today}=EMA(6)(EMA_{today}) \quad [\text{Equation 11}]$$

$$EMA3_{today}=EMA(6)(EMA2_{today}) \quad [\text{Equation 12}]$$

Then, the same calculations are performed for yesterday's closing price, generating a $EMA3_{yesterday}$ value. TRIX is then calculated as:

$$TRIX=(EMA3_{today}-EMA3_{yesterday})/EMA3_{yesterday} \quad [\text{Equation 13}]$$

This calculation produces a percentage value. A further value, $TRIX_{signal}$, is calculated in order to smooth the TRIX, as follows:

$$TRIX_{signal}=EMA(n_2)(TRIX) \quad [\text{Equation 14}]$$

Preferably, n2 is set to 4, but other combinations of n and n2 are possible including, respectively, 10 and 5, 14 and 12, or others. Another method of calculating TRIX using the natural log(ln) function is known in the art, but it is believed that the presently discussed method generates more accurate signals.

For this TAI, a new positive development (NPD) occurs when TRIX becomes higher than $TRIX_{signal}$. This TAI is no longer positive when TRIX becomes lower than $TRIX_{signal}$. If this TAI is still positive tomorrow, it will no longer be new, but will instead be a cumulative positive development (CPD). FIG. 3 is a graph depicting the use of TRIX. The top portion of FIG. 3, labeled "Price," is a chart of the trading ranges of U.S. Airways Group, Inc. stock (ticker symbol: LCC) from Oct. 20, 2005 to Dec. 19, 2005. The bottom portion of FIG. 3, labeled "TRIX," shows calculated TRIX and $TRIX_{signal}$ values for the same period, as well as a differential histogram showing $TRIX-TRIX_{signal}$. As can be seen from the graph, TRIX became greater than $TRIX_{signal}$ on Oct. 25, 2005. On that day, TRIX was a new positive development (NPD). From Oct. 26, 2005 to Nov. 15, 2005, TRIX remained positive. As a result, on each of the days in the range, TRIX was a cumulative positive development. On Nov. 16, 2005, TRIX became less than $TRIX_{signal}$, and therefore TRIX was no longer a positive development.

Besides, DPO, MACD and TRIX, additional calculations are also made regarding each monitored issue to further assist the user. For each issue, the Average True Range (ATR), Relative Average True Range (RATR) and Commodity Channel Index (CCI) are calculated. ATR is a measure only of price volatility. It does not indicate either the direction of prices or the duration of a trend. ATR can be based on any period n, but a 14-day period is used in the preferred embodiment. ATR is calculated using True Range (TR) values. TR is defined as the maximum of T1, T2 and T3 where:

T1=current period's high−current period's low

T2=absolute value of (current period's high−previous period's close)

T3=absolute value of (current period's low−previous period's close)

ATR is therefore defined as:

$$ATR=EMA(14)(TR) \quad [\text{Equation 15}]$$

RATR is a more useful measure of volatility. It is defined as the end-of-day ATR divided by closing price. Because RATR is defined relative to the closing price, rather than as an absolute measure of volatility (e.g., ATR), the volatility of any one issue may be easily compared to that of another. RATR is more useful than other measures of volatility such as Beta, which measure not absolute volatility, but the volatility of an issue relative to an index.

The Commodity Channel Index (CCI) is also calculated. CCI is a price oscillator used to find trend changes and strength. The "channel" is the range from 100 to −100. Most of the CCI's random fluctuations should fall within that channel. Movements outside the range are assumed to be non-random, and may represent trading opportunities. To calculate CCI, a cycle period, n, of 14 days is used. First, the Mean Price (MP) is calculated for each day:

$$MP_i=(H_i+L_i+C_i)/3 \quad [\text{Equation 16}]$$

In the above equation, $H_i$=highest price for day i, $L_i$=lowest price for day i and $C_i$=closing price for day i. Next, the simple moving average (SMA) of the Mean Prices for the period are calculated:

$$AM=SMA(14)(MP) \quad [\text{Equation 17}]$$

Then, the difference $DI_i$ between the AM on day i and the MP on day i is calculated for all days from (n−1) days ago to today, inclusive, resulting in n $D_i$ values. The Mean Deviation is then calculated as the sum of the absolute values of DI divided by n, or:

$$MD = \left(\sum_{i=1}^{n} \text{ABS}(DI_i)\right) / n \qquad \text{[Equation 18]}$$

Finally, CCI is calculated:

$$CCI_{today} = (MP_{today} - AM_{today})/(MD*0.015) \qquad \text{[Equation 19]}$$

The 0.015 value is a scaling factor used to place seventy to eighty percent of CCI values in the channel.

Several other TAIs are calculated, and positive developments related thereto are determined as well. The On Balance Volume (OBV), Parabolic Stop and Reversal (PSAR), Positive Directional Indicator (PDI) and SMA199 are also calculated. The calculation of these TAIs are well know in the art.

The On Balance Volume (OBV) is a TAI that relates volume to closing price. A new positive development occurs when OBV crosses above its three-period EMA. That is, an NPD occurs on the day OBV becomes higher than EMA(3) (OBV). OBV is no longer positive when OBV crosses under its three-period EMA. If OBV is still a PD tomorrow, it will no longer be new, but will instead be a cumulative positive development. If OBV was a NPD yesterday and is still positive today, then it becomes a CPD.

Parabolic Stop And Reverse (PSAR) is a price and time trending indicator that is more often used to set exit points, but can also be used to detect new entry points for both long and short positions. Unlike most TAIs, PSAR is not a continuous line. If PSAR were a continuous line, when PSAR crosses under the closing price line, a positive development occurs. So, when PSAR starts a new line segment under the closing price line, a positive development occurs. PSAR is no longer a positive development when it crosses over the closing price. If PSAR were an NPD yesterday (or previously), and is still positive today, then PSAR becomes a CPD.

Positive Directional Indicator (PDI) is one of several indicators developed by J. Welles Wilder, Jr. as part of the Average Directional Index (ADX). PDI is sometimes written as "+DI." The Minus Directional Indicator (MDI) is sometimes written as "−DI." The calculation of these three indicators is well known in the art. PDI is a positive development when +DI becomes higher than −DI and either ADX rises while +DI and ADX are above −DI or ADX turns up from below +DI and −DI.

SMA199 is a simple indicator. An NPD occurs for this TAI when the 1 day simple moving average of the closing price becomes higher than the 199 day simple moving average of the closing price. That is, SMA199 becomes a positive development when SMA(1)(Closing Price) becomes higher than SMA(199)(Closing Price). SMA199 is no longer positive when SMA(1)(Closing Price) becomes lower than SMA (199)(Closing Price). If SMA199 is still positive tomorrow, it will no longer be new but will instead be a CPD.

Finally, the 20-day simple moving average of the volume is calculated.

Although in the preferred embodiment the seven above-referenced TAIs are calculated, it will be appreciated that additional TAIs may be calculated, with respect to which positive developments may be determined. Other possible TAIs include, for instance, Arms' Ease of Movement, Bollinger Bands, the Chaikin (Accumulation/Distribution) Oscillator and the Chande Momentum Oscillator.

FIG. 5 will now be discussed in greater detail. Preferably, to perform the tasks outlined in FIG. 5, the Unix/Linux application CRON launches applications to perform such tasks at predetermined times. In step S110 of the preferred embodiment, database server 30 calculates DPO, MACD, $MACD_{signal}$, TRIX, $TRIX_{signal}$, ATR, RATR, CCI, OBV, EMA(3)(OBV), PSAR, −DI, +DI, ADX, SMA(1)(Closing Price), SMA(199)(Closing Price) and the 20-day simple moving average of the volume for each and every issue being monitored. Database server 30 also determines whether any of the TAIs are positive developments (i.e., an NPD or CPD). As noted, these calculations and determinations are performed on the database server 30. However, those of skill in the art will appreciate that all these calculations may if needed be performed on web server 20 without departing from the spirit of the present invention.

In order to save computing time and permit reports to be produced as soon as possible after the end of the trading day, the above-referenced calculations are not performed for inactive issues. An issue is marked inactive if any of the following are true: The 40-day simple moving average of its closing price is $2.00 or less; the 20-day simple moving average of its volume is 40,000 shares or less; the issue has less than 31 trading days of history; or, there were zero trades in the preceding week. In the preferred embodiment, although roughly 12,000 issues are monitored, only roughly 4,000 are active at any given time. Inactive issues are reevaluated weekly.

An example will be used for the sake of illustration. On Apr. 25, 2006, U.S. Airways Group, Inc. (Ticker: LCC), DPO was above zero, MACD was higher than $MACD_{signal}$, and TRIX was higher than $TRIX_{signal}$. In other words, these three TAIs were positive developments. One of these three TAIs was a new positive development on that day. Further, three of OBV, PSAR, PDI, and SMA199 were also positive developments, none of which were new on that day. ATR was calculated to be 2.15, RATR was calculated to be 5.04%, CCI was calculated to be 198.35, and the 20-day simple moving average of the volume was calculated to be 1,486,700.

At step S120, a subset of the issues are selected based on predetermined selection criteria. In the preferred embodiment, only those issues for which DPO, MACD and TRIX are positive developments and at least one of DPO, MACD and TRIX is a new positive development are selected. On Apr. 25, 2006, there were 21 issues meeting these selection criteria, including LCC.

At step S130, a report is prepared. For each issue selected in step S120, a report prepared according to the preferred embodiment of the present invention indicates the number of new positive developments, as well as the total cumulative positive developments (TCPD), for both the selection TAIs (i.e., DPO, MACD and TRIX) and all seven TAIs calculated (DPO, MACD, TRIX, OBV, PSAR, PDI and SMA199). The report further includes the 20-day moving average of the volume, ATR, RATR, and CCI. In the preferred embodiment, the report is in plain text, and the issues are sorted by RATR in decreasing order. Thus, the issues with the highest relative volatility are listed first.

At step S140, the prepared report is e-mailed to the client 10 by way of an automated e-mailing process. Additionally, a copy of the report may be placed on web server 20 for download from the web site.

FIG. 6 is an example of a report prepared at step S130 according to the teachings of the present invention. This report is called the "Daily Abbreviated Report" or DAR, and the sample DAR shown at FIG. 6 is from Apr. 25, 2006. The left column, labeled "Symbol," and second column, labeled "Close," are self-explanatory. The letter "S" refers to the selection criteria. In other words, "S" refers to DPO, MACD and TRIX. "C" indicates total cumulative positive developments (that is, new positive developments plus cumulative positive developments). As can be clearly seen from FIG. 6, each selected issue has three total cumulative positive developments. Such a result is dictated by our selection criteria (i.e., that DPO, MACD and TRIX must all be positive developments, at least one of which must be an NPD). "N" refers to new positive developments. Each of the 21 issues in this report has exactly one new positive development and exactly two cumulative positive developments, i.e., three total cumulative positive developments. The report does not indicate which positive developments are new. Each issue having exactly one new positive development and exactly two cumulative positive developments is not typically the case, as issues will often have more than one NPD. "A" refers to all TAIs being calculated, and "C" and "N" refer total cumulative and new positive developments as discussed above. For example, LCC has six total cumulative positive developments, one of which is new. In other words, of DPO, MACD, TRIX, OBV, PSAR, PDI and SMA199, there are six positive developments. One of these six positive developments is a new positive development.

ATR, RATR, CCI, and the 20 day simple moving average of the volume are also presented.

FIG. 7 is a portion of another report (only the top 43 issues are shown—the full report contains 104 issues) prepared according to another embodiment of the present invention. This report is called the 2W43 report, shorthand for "two waiting for three." The 2W43 report is prepared contemporaneously with the DAR after the close of trading. The purpose of the 2W43 report is to show those issues for which exactly two of the three selection TAIs (i.e., DPO, MACD and TRIX) are positive developments. The 2W43 report therefore provides a user with a number of issues that nearly appeared on the DAR, and therefore have a better than usual chance of appearing on the next day's DAR. FIG. 7 is a sample 2W43 report from Jun. 12, 2006. The left-most column, labeled "issue," contains the ticker symbols of the issues selected for the report. Referring to the right-most portion of the report, there are three columns labeled "TRIX," "MACD" and "DPO," corresponding to each of the selection TAIs. For each issue in the 2W43 report, each selection TAI may either be a cumulative positive development (CPD), new positive development (NPD), or it may be "needed," i.e., not a positive development. Given the bases for selecting issues for the 2W43 report, it is therefore clear that each issue in the 2W43 report will have two TAIs as positive developments (either CPDs or NPDs), and one TAI that is "needed." For instance, with respect to the fourth issue from the top, PG, TRIX and MACD are CPDs, whereas DPO is needed.

The column labeled "Closing" contains the closing price of the issue. The column labeled "Target" contains the closing price at which the "needed" TAI would become a positive development (an NPD, to be exact). P_delta is the difference between the target closing price and today's closing price, or Target minus Closing. P_reqd is the price change as a percentage of closing price shown as a decimal value, or P_delta divided by Closing. ATR is the Average True Range, discussed above. ATRCM is the Average True Range Coverage Multiple, or ATR divided by P_delta. ATRCM is significant in that, if ATR represents a "reasonable" variance, then the higher the ATRCM, the more "reasonable" it is to think that the next day's closing price will reach the Target. A-ATRCM is the absolute value of the ATRCM. The 2W43 report is sorted by A-ATRCM in descending order.

FIG. 8 is a portion of another report (only the top 48 issues are shown—the full report contains 57 issues) prepared according to another embodiment of the present invention. This report is called the 2W43-NRT report, "NRT" being an acronym for "near real time." The 2W43-NRT report is prepared around 2 p.m. central standard time each day, and tracks the progress of the issues noted in the previous night's 2W43 report towards the respective issues targets closing prices. Referring to FIG. 8, the column headings Issue, ATR, ATRCM, A-ATRCM, RATR, TRIX, MACD and DPO are identical to the corresponding headings of the 2W43 report disclosed in FIG. 8. The column labeled "target_price" is the "Target" closing price from the previous evening's 2W43 report. The column labeled "last_price" is the last price of the issue before the report was prepared. The column labeled "percent_achieved" is last_price divided by target_price, expressed as a percentage. As is clearly shown in FIG. 8, the issues BMET, PG, KMB, ADBE and EXC have exceeded their respective target prices whereas, for instance, ERTS is one cent short. FIG. 8 contains fewer issues than the corresponding 2W43 report (i.e., 57 versus 104) because, in the 2W43-NRT report, only those issues for which the last_price is greater than ninety five percent of the target_price are selected. The 2W43-NRT report allows a user to purchase those issues for which, at the time the 2W43-NRT report was sent, all three of DPO, MACD and TRIX were positive developments, one of which was a new positive development, before the close the close of trading that day.

It will be appreciated that the present invention may be modified in many ways. For instance, web server 20 and database server 30 may be consolidated on a single server, or the duties of both the web server 20 and database server 30 may instead be further split between separate servers. Optimizations to the present invention are also possible, including pre-calculating values needed in determining positive developments. It will be apparent to those of skill in the art that various modifications can be made in the design of the system disclosed herein without departing from the scope or spirit of the present invention, and that the claims are not limited to the preferred embodiment illustrated.

The invention claimed is:

1. A method of using a data processing system to perform technical analysis on issues and preparing a report of the analysis that lists two integers for a subset of the issues for simplified user decision making, the method comprising:
   obtaining pricing information for a plurality of issues, wherein the pricing information indicates for each of a plurality of issues at least a series of trading day closing prices up to and including a trading day on which the report is being prepared;
   calculating, using a computer, a preselected plurality of technical analysis indicators for each of the plurality of issues based on the pricing information;
   selecting a first subset of issues from the plurality of issues, wherein each of the preselected plurality of technical analysis indicators for each of the first subset of issues indicates that a price of the issue is likely to increase in the near future;
   preparing a first report for a user indicating the identity of each of the first subset of issues and, for each of the issues in the first subset of issues, providing a first integer indicating the number of the preselected plurality of technical analysis indicators that indicate a price of the issue is likely to increase in the near future, and providing a second integer indicating the number of the preselected plurality of technical analysis indicators that indicate a price of the issue is likely to increase in the near future and that on a trading day immediately prior to the trading day for which the first report is compiled did not indicate that the price of the issue is likely to increase in the near future.

2. The method of claim 1, further comprising transmitting the first report to the user.

3. The method of claim 1, wherein the preselected plurality of technical analysis indicators comprise a detrended price oscillator, moving average convergence/divergence and triple exponential smoothing of the log of the closing price.

4. The method of claim 3, wherein:
the detrended price oscillator indicates that the price of an issue is likely to increase in the near future if the detrended price oscillator is positive;
the moving average convergence/divergence histogram indicates that the price of an issue is likely to increase in the near future if the moving average convergence/divergence is positive; and
the triple exponential smoothing of the log of the closing price indicates that the price of an issue is likely to increase in the near future if the triple exponential smoothing of the log of the closing price is above a triple exponential smoothing of the log of the closing price signal value.

5. The method of claim 1, wherein the first report is transmitted by e-mail.

6. The method of claim 1, further comprising obtaining trading volume information for a plurality of issues.

7. The method of claim 6, further comprising calculating at least one further technical analysis indicator in addition to the preselected plurality of technical analysis indicators, the at least one further technical analysis indicator selected from the group consisting of on balance volume, parabolic stop and reversal, positive directional indicator, and a simple moving average.

8. The method of claim 1, wherein the first report further indicates the values for each of the preselected plurality of technical analysis indicators, for each issue in the first subset of issues.

9. The method of claim 1, wherein the number of technical analysis indicators in the preselected plurality of technical analysis indicators is N, further comprising:
selecting a second subset of issues from the plurality of issues, each respective issue of the second subset of issues having exactly N−1 of the preselected plurality of technical analysis indicators indicating the price of the respective issue is likely to increase in the near future; and
preparing a second report for a user indicating the identity of each of the second subset of issues, which of the preselected plurality of technical analysis indicators indicate the price of the respective issue is likely to increase, which of the preselected plurality of technical analysis indicators indicate the price of the respective issue is not likely to increase, and a target closing price at which a preselected technical analysis indicator indicating the price of the respective issue is not likely to increase becomes a preselected technical analysis indicator indicating the price of the respective issue is likely to increase.

10. The method of claim 1, further comprising calculating a relative average true range for each issue in the subset of issues, and wherein the first report further indicates the relative average true range for each issue in the subset of issues.

11. The method of claim 6, further comprising:
calculating a simple moving average of the trading volume over a predetermined time frame for each issue in the first subset of issues;
calculating a commodity channel index for each issue in the first subset of issues; and
wherein the first report further indicates the simple moving average of the trading volume and the commodity channel index for each issue in the first subset of issues.

12. A method of using a data processing system to perform technical analysis after the close of a current trading day on issues comprising:
obtaining pricing information for a plurality of issues, wherein the pricing information indicates at least a series of trading day closing prices for each of the plurality of issues;
calculating, using a computer, a preselected plurality of technical analysis indicators for each of the plurality of issues based on the pricing information;
selecting a first subset of issues from the plurality of issues, wherein each of the preselected plurality of technical indicators for each of the first subset of issues indicates that a price of the issue is likely to increase in the near future, and wherein on a trading day immediately before the current trading day exactly one of the preselected plurality of technical analysis indicators did not indicate that the price of the issue is likely to increase in the near future when it was calculated;
preparing a first report for a user indicating the identity of each of the first subset of issues and, for each of the issues in the first subset of issues, providing a first integer indicating the number of the preselected plurality of technical analysis indicators that indicate a price of an issue is likely to increase in the near future, and providing a second integer indicating the number of the preselected plurality of technical analysis indicators that indicate a price of the issue is likely to increase in the near future and that on a trading day immediately prior to the trading day for which the first report is compiled did not indicate that the price of the issue is likely to increase in the near future; and
transmitting the first report to the user.

13. The method of claim 12, wherein the preselected plurality of technical analysis indicators comprise a detrended price oscillator, moving average convergence/divergence and triple exponential smoothing of the log of the closing price.

14. The method of claim 13, wherein:
the detrended price oscillator indicates that the price of an issue is likely to increase in the near future if the detrended price oscillator is positive;
the moving average convergence/divergence histogram indicates that the price of an issue is likely to increase in the near future if the moving average convergence/divergence is positive; and
the triple exponential smoothing of the log of the closing price indicates that the price of an issue is likely to increase in the near future if the triple exponential smoothing of the log of the closing price is above a triple exponential smoothing of the log of the closing price signal value.

15. A non-transitory computer-readable medium having executable instructions to cause a computer to perform a method comprising:
obtaining pricing information for a plurality of issues, wherein the pricing information indicates at least a series of trading day closing prices for each of the plurality of issues;

calculating a preselected plurality of technical analysis indicators for each of the plurality of issues based on the pricing information;

selecting a first subset of issues from the plurality of issues, wherein each of the preselected plurality of technical analysis indicators for each of the first subset of issues indicates that a price of the issue is likely to increase in the near future;

preparing a first report for a user indicating the identity of each of the first subset of issues and, for each of the issues in the first subset of issues, providing a first integer indicating the number of the preselected plurality of technical analysis indicators that indicate a price of the issue is likely to increase in the near future, and providing a second integer indicating the number of the preselected plurality of technical analysis indicators that indicate a price of the issue is likely to increase in the near future and that on a trading day immediately prior to the trading day for which the first report is compiled did not indicate that the price of the issue is likely to increase in the near future; and transmitting the first report to the user.

16. The computer-readable medium of claim 15, wherein the preselected plurality of technical analysis indicators comprise a detrended price oscillator, moving average convergence/divergence and triple exponential smoothing of the log of the closing price.

17. The computer-readable medium of claim 16, wherein:

the detrended price oscillator indicates that the price of an issue is likely to increase in the near future if the detrended price oscillator is positive;

the moving average convergence/divergence histogram indicates that the price of an issue is likely to increase in the near future if the moving average convergence/divergence is positive; and the triple exponential smoothing of the log of the closing price indicates that the price of an issue is likely to increase in the near future if the triple exponential smoothing of the log of the closing price is above a triple exponential smoothing of the log of the closing price signal value.

* * * * *